United States Patent [19]

Kobayashi et al.

[11] Patent Number: 4,917,205

[45] Date of Patent: Apr. 17, 1990

[54] FOUR-WHEEL STEERING SYSTEM

[75] Inventors: Kazuyoshi Kobayashi, Oobu; Shozo Takizawa; Kazuo Fukuyama, both of Okazaki, all of Japan

[73] Assignee: Mitsubishi Jidosha Kogyo Kabushiki Kaisha, Tokyo, Japan

[21] Appl. No.: 170,868

[22] Filed: Mar. 21, 1988

[30] Foreign Application Priority Data

Mar. 23, 1987 [JP] Japan .............................. 62-42360[U]
Mar. 31, 1987 [JP] Japan .............................. 62-46819[U]

[51] Int. Cl.[4] ........................ B62D 5/087; B62D 7/14
[52] U.S. Cl. ..................................... 180/140; 91/447; 91/517; 180/141; 180/142; 280/91
[58] Field of Search ............... 180/140, 141, 142, 143; 280/91, 99; 91/517, 447

[56] References Cited

U.S. PATENT DOCUMENTS

| 3,198,088 | 8/1965 | Johnson et al. | 91/447 X |
| 3,566,749 | 3/1971 | Allen et al. | 91/447 X |
| 3,572,460 | 3/1971 | Beruch | 180/140 |
| 4,398,616 | 8/1983 | Braden et al. | 180/140 |
| 4,441,572 | 4/1984 | Ito et al. | 180/140 |
| 4,558,631 | 12/1985 | Fassbender | 91/517 X |
| 4,709,935 | 12/1987 | Takizawa et al. | 280/91 |
| 4,811,805 | 3/1989 | Yoshida et al. | 180/140 |

FOREIGN PATENT DOCUMENTS

| 184061 | 10/1984 | Japan | 180/140 |
| 175177 | 8/1986 | Japan | 180/141 |
| 61-196875 | 9/1986 | Japan | . |
| 110571 | 5/1987 | Japan | 180/140 |
| 110572 | 5/1987 | Japan | 180/140 |
| 62-34585 | 7/1987 | Japan | . |

Primary Examiner—Mitchell J. Hill
Attorney, Agent, or Firm—Hedman, Gibson, Costigan & Hoare

[57] ABSTRACT

A four-wheel steering system of a vehicle includes a power steering device for steering the front wheels, an oil pressure pump for generating an oil pressure in accordance with a travel speed of the vehicle, and a hydraulic actuator for steering the rear wheels. A first control valve is provided between the pump and the actuator so as to operate upon reception of the oil pressure from the power steering device. This valve introduces the oil pressure from the pump to the actuator in accordance with the oil pressure from the power steering device so that the actuator steers the rear wheels in the same direction as the front wheels. A second control valve is provided between the power steering device and the actuator so as to operate in accordance with the oil pressure from the power steering device. When the oil pressure from the power steering device exceeds a predetermined value, the second control valve operates to introduce the oil pressure from the power steering device to the actuator so that the actuator steers the rear wheels in the opposite direction to the front wheels.

10 Claims, 6 Drawing Sheets

FOUR-WHEEL STEERING SYSTEM

BACKGROUND OF THE INVENTION

1. Field of the Invention

The present invention relates to a four-wheel steering system attached to a vehicle such as an automobile.

2. Description of the Prior Art

The present applicant has filed Japanese Utility Model Application No. 60-172085 as a four-wheel steering system attached to a vehicle such as an automobile. This system comprises an oil pump (oil pressure source) which is interlocked with gears in a rear-wheel differential device of a rear-wheel drive vehicle or a four-wheel drive vehicle, and a hydraulic circuit for supplying the oil pressure generated by the oil pump to a hydraulic actuator for steering rear wheels. An oil pressure switching valve for in-phase steering is interposed midway along the hydraulic circuit. The switching valve receives the oil pressure generated by a power steering device for front wheels as a pilot signal pressure, and controls an oil pressure supplied from the oil pump to the hydraulic actuator and switches oil pressure supply paths in accordance with the pilot signal pressure, thereby steering the rear wheels in the same direction as the front wheels. In this case, a driving gear of the oil pump is meshed with the gear provided in the differential device. When the driving gear of the oil pump is rotated by the gear of the differential device, an oil pressure corresponding to a vehicle velocity is generated by the oil pump. For this reason, if the front wheels are steered while the vehicle is moving at high speed, high-pressure working fluid is supplied from the oil pump, through the oil pressure switching valve, to the hydraulic actuator which then steers the rear wheels in the same direction as the front wheels, thereby improving travel stability of the vehicle. Since, when the vehicle is moving at low speed, the rotational speed of the gears in the differential device is low, the oil pressure generated by the oil pump is also low. As a result, the hydraulic actuator is not actuated by the oil pressure, and is held in a neutral position. Therefore, if, in this situation, the front wheels are steered, the rear wheels are held in the neutral position, i.e. they are not steered.

However, since, according to the system having the above structure, the rear wheels are held in the neutral, i.e. non-steering, position when the vehicle is moving at low speed, the rear wheels then cannot be steered in the opposite direction to the front wheels, in order to reduce the turning radius of the vehicle, and thus cannot facilitate parking, for example.

Another oil pressure source for the antiphase steering may be provided to steer the rear wheels in the opposite direction to the front wheels while the vehicle is moving at low speed, so that an oil pressure is supplied from the oil pressure source for the antiphase steering to the hydraulic actuator, thereby steering the rear wheels in the opposite direction to the front wheels. However, in this case, an oil pressure source for antiphase steering and a control mechanism for controlling this oil pressure source are required, resulting in a complicated structure and high cost.

SUMMARY OF THE INVENTION

The present invention has been made in consideration of the above situation, and has as its object to provide a four-wheel steering system which can steer the rear wheels in the opposite direction to the front wheels during low-speed travel of a vehicle and can reduce a slewing radius, thereby facilitating a garaging operation or the like, and which can be simplified in a structure.

In order to achieve the above object, according to the system of the present invention, a hydraulic circuit for connecting between a hydraulic actuator and an oil pressure source for generating an oil pressure corresponding to a vehicle speed is provided with a first control valve, for in-phase steering, which is responsive to the oil pressure generated by a power steering device so as to switch supply paths of working fluid supplied from the oil pressure source to the hydraulic actuator, thereby steering the rear wheels in the same direction as the front wheels during high-speed travel of the vehicle when a high oil pressure is generated by the oil pressure source, and a second control valve, used for antiphase steering, for introducing the oil pressure generated by the power steering device to the hydraulic actuator so as to steer the rear wheels in the opposite direction to the front wheels when the oil pressure generated by the power steering device exceeds a predetermined value during low-speed travel of the vehicle or at a large steering angle.

More specifically, as in high-speed travel of the vehicle, when the oil pressure source generates a high oil pressure and the power steering device generates a low oil pressure, the second control valve is not actuated, and the first control valve switches the supply paths of the working fluid supplied from the oil pressure source to the hydraulic actuator in response to the oil pressure generated by the power steering device, thereby steering the rear wheels in the same direction as the front wheels. When a steering wheel is turned at a large angle during low-speed travel of the vehicle, the oil pressure generated by the power steering device is increased to be higher than a predetermined pressure. In this case, the in-phase steering by the first control valve is not achieved, and an oil pressure supply path for the antiphase steering is opened by the second control valve. Thus, the oil pressure generated by the power steering device is supplied to the hydraulic actuator, thereby steering the rear wheels in the opposite direction to the front wheels.

BRIEF DESCRIPTION OF THE DRAWINGS

FIGS. 1 to 4 show a four-wheel steering system according to a first embodiment of the present invention, in which FIGS. 5 to 8 show a four-wheel steering system according to a second embodiment of the present invention, in which

DETAILED DESCRIPTION OF THE PREFERRED EMBODIMENTS

Preferred embodiments of the present invention will be described with reference to the accompanying drawings.

Figure 1:
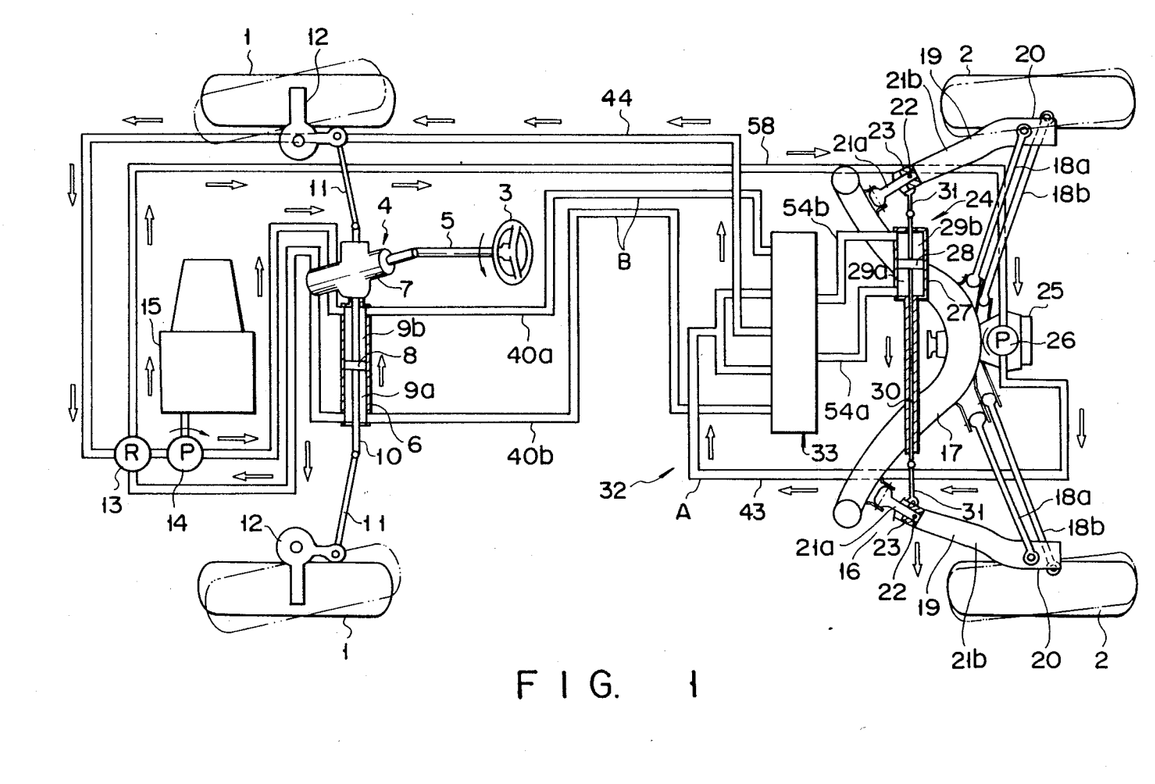
FIG. 1 is a schematic view showing the overall arrangement of the system.

FIG. 1 shows a state wherein a four-wheel steering system according to a first embodiment of the present invention is installed in a vehicle. The vehicle comprises a pair of front wheels 1 and a pair of rear wheels 2. Front wheels 1 are steered by steering wheel 3 through power steering device 4. Steering wheel 3 is coupled to power cylinder 6 of the power steering device through steering shaft 5 and steering gear box 7.

The interior of power cylinder 6 of power steering device 4 is partitioned into left and right chambers 9a and 9b by piston 8. Two end portions of piston rod 10 of piston 8 are coupled to knuckle arms 12 for supporting front wheels 1 through tie rods 11. Steering gear box 7 incorporating a power steering control valve is connected to left and right chambers 9a and 9b of power cylinder 6, reservoir tank 13, and oil pump 14. In this case, oil pump 14 is driven by engine 15.

Rear suspension 16 of the vehicle is constituted by cross member 17, two pairs of upper and lower lateral arms (upper and lower arms 18a and 18b), and a pair of trailing arms 19. Outer end portions of each pair of upper and lower arms 18a and 18b are coupled to corresponding rear-wheel support member 20 for supporting rear wheel 2, and inner end portions of arms 18a and 18b are coupled to the central portion of cross member 17. A leading end portion of each trailing arm 19 is coupled to one of the outer end portions of cross member 17, and its trailing end portion is fixed to rear-wheel support member 20. Each trailing arm 19 is divided into front and rear arms 21a and 21b. Front and rear arms 21a and 21b are pivotally coupled by substantially vertical pivot shaft 22. Elastic member 23 such as rubber is attached between each leading end portion of rear arm 21b and the corresponding trailing end portion of front arm 21a.

The four-wheel steering system comprises hydraulic actuator 24 for steering the rear wheels, and oil pump (oil pressure source) 26, driven by a gear arranged in rear-wheel differential device 25, for steering the rear wheels. Hydraulic actuator 24 is fixed to cross member 20 along the widthwise direction of the vehicle. Hydraulic actuator 24 comprises hydraulic cylinder 27. The interior of hydraulic cylinder 27 is partitioned into left and right chambers 29a and 29b by piston 28. Two end portions of piston rod 30 of piston 28 are coupled to the leading end portions of corresponding rear arms 21b through tie rods 31.

Figure 2:
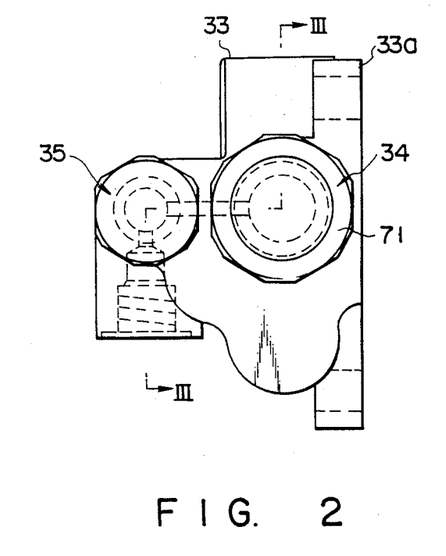
FIG. 2 is a side view of a control valve unit.
Figure 3:
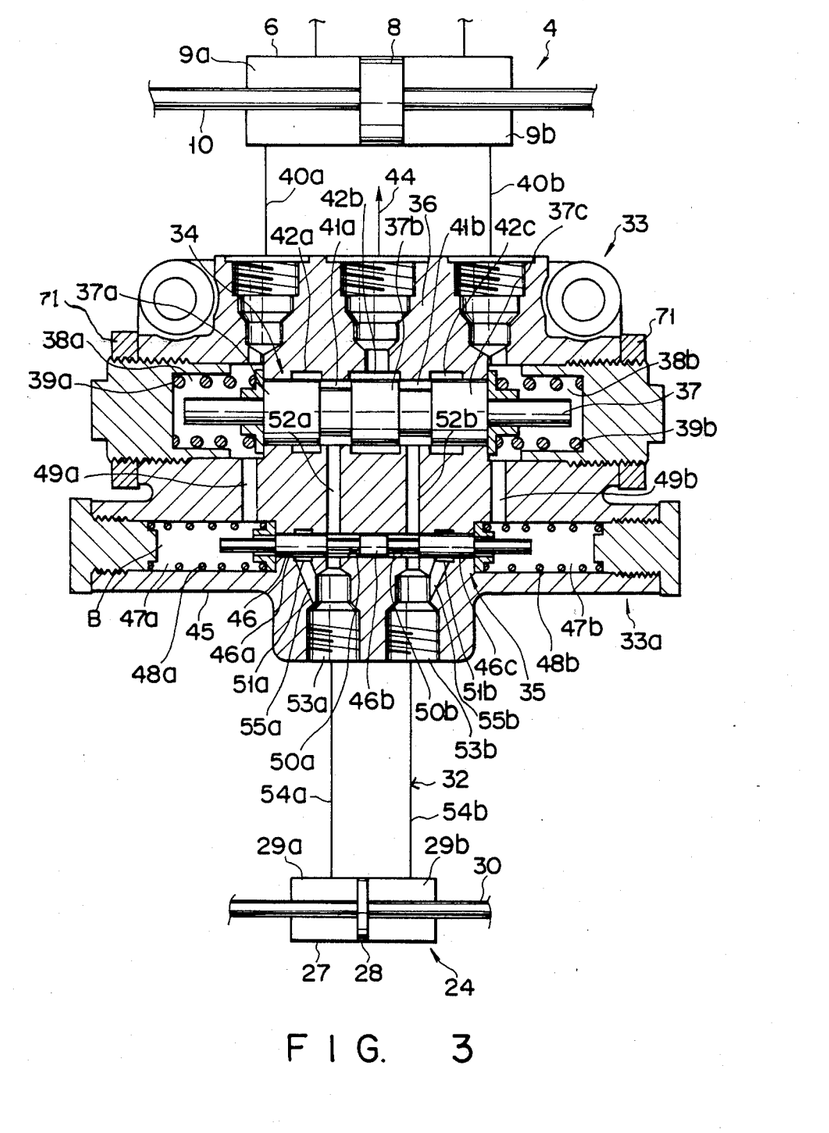
FIG. 3 is a sectional view taken along line III—III in FIG. 2.

Control valve unit 33 is interposed midway along hydraulic circuit 32, as a first hydraulic circuit for coupling between hydraulic actuator 24 and oil pump 26. As is shown in FIGS. 2 and 3, first control valve 34 for the in-phase steering and second control valve 35 for the antiphase steering are disposed in valve housing 33a of control valve unit 33. First control valve 34 has sleeve 36 formed in valve housing 33a, and spool 37 which is arranged in sleeve 36 to be axially movable. Spool 37 is prevented from coming out of sleeve 36 by set nuts 71. Pilot signal pressure introduction chambers 38a and 38b are respectively formed in left and right end portions in sleeve 36. Compression springs 39a and 39b for holding spool 37 in a neutral position shown in FIG. 3 are respectively disposed in introduction chambers 38a and 38b. Left introduction chamber 38a communicates with left chamber 9a of power cylinder 6 through communication path 40a. Right introduction chamber 38b communicates with right chamber 9b of power cylinder 6 through communication path 40b. Communication paths 40a and 40b constitute a second hydraulic circuit. Lands 37a, 37b, and 37c are formed on the outer periphery of spool 37. First valve chamber 41a is defined between lands 37a and 37b, and second valve chamber 41b is defined between lands 37b and 37c. First, second, and third annular grooves 42a, 42b, and 42c are formed on the inner periphery of sleeve 36. In this case, second annular groove 42b is formed to face land 37b of spool 37 when spool 37 is held in the neutral position. First and third annular grooves 42a and 42c are formed such that a small-diameter portion between first and second annular grooves 42a and 42b faces first valve chamber 41a, and a small-diameter portion between second and third annular grooves 42b and 42b faces second valve chamber 41b. First and third annular grooves 42a and 42c of sleeve 36 communicate with the discharge port of oil pump 26 through oil introduction path 43 of hydraulic circuit 32. Second annular groove 42b of sleeve 36 is connected to reservoir tank 13 through oil return path 44.

As is shown in FIG. 3, second control valve 35 is constituted by sleeve 45 formed in valve housing 33a of control valve unit 33, and spool 46 which is located in sleeve 45 to be axially movable. Valve left and right chambers 47a and 47b are respectively defined in left and right end portions in sleeve 45. Compression springs (biasing members) 48a and 48b are respectively disposed in left and right chambers 47a and 47b. In this case, the operating pressure of spool 46 is set by the biasing force of springs 48a and 48b to be a value (e.g., 40 kg/cm$^2$) slightly lower than an oil pressure (e.g., 60 kg/cm$^2$) generated by power steering device 4 when a steering operation is performed during low-speed travel of the vehicle. Note that an oil pressure generated by power steering device 4 when the steering operation is performed during high-speed travel is set to be about 20 kg/cm$^2$.

Valve left chamber 47a communicates with left pilot signal pressure introduction chamber 38a through coupling path 49a, and valve right chamber 47b communicates with right pilot signal pressure introduction chamber 38b through coupling path 49b. Lands 46a, 46b, and 46c are respectively formed on the outer periphery of spool 46. First valve chamber 50a is defined between lands 46a and 46b, and second valve chamber 50b is defined between lands 46b and 46c. First and second annular grooves 51a and 52b are formed on the inner periphery of sleeve 45. In this case, first annular groove 51a is formed at a position facing a middle portion of land 46a of spool 46 when spool 46 is held in the neutral position, while second annular groove 51b is formed at a position facing a middle portion of land 46c of spool 46. Valve housing 33a includes coupling path 52a for connecting first valve chambers 41a and 50a of first and second control valves 34 and 35, and coupling path 52b for connecting second valve chambers 41b and 50b of first and second control valves 34 and 35 when spools 37 and 46 of first and second control valves 34 and 35 are held in their neutral positions. First and second ports 53a and 53b are formed in sleeve 45. First and second ports 53a and 53b are formed at positions corresponding to coupling paths 52a and 52b. First port 53a communicates with left chamber 29a of hydraulic cylinder 27 through first oil path 54a of hydraulic circuit 32, and second port 53b communicates with right chamber 29b of hydraulic cylinder 27 through second oil path 54b of hydraulic circuit 32. First and second oil paths 54a and 54b also constitute a part of a the second hydraulic circuit. First annular groove 51a of sleeve 45 communicates with first port 53a through coupling path 55a, and second annular groove 51b communicates with second port 53b through coupling path 55b.

Oil pressure supply path A for in-phase is constituted by oil introduction path 43 of hydraulic circuit 32, first and third annular grooves 42a and 42c and first and second valve chambers 41a and 41b of first control valve 34, coupling paths 52a and 52b, first and second valve chambers 50a and 50b of second control valve 35, first and second ports 53a and 53b, and first and second oil paths 54a and 54b. The working fluid is supplied from oil pump 26 to hydraulic actuator 24 through path A, thereby steering rear wheels 2 in the same direction as front wheels 1.

Figure 4:
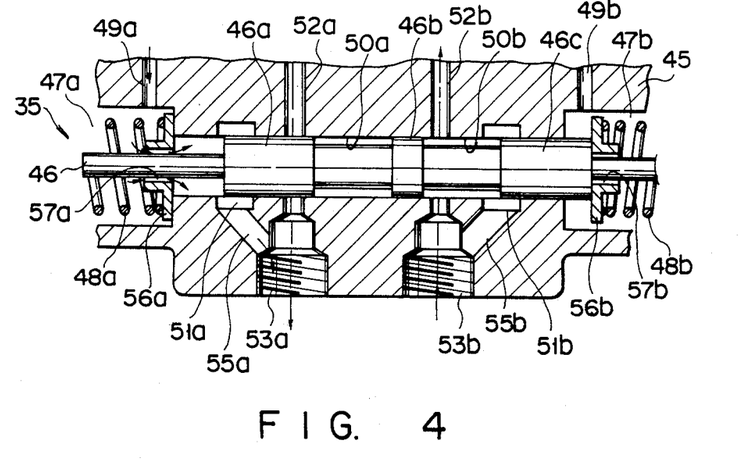
FIG. 4 is an enlarged sectional view showing a part of the control valve unit.

As is shown in FIG. 4, appropriate clearances are defined between spring receptacles 56a and 56b disposed in valve left and right chambers 47a and 47b of second control valve 35 and the outer surfaces of the two end portions of spool 46. These clearances define oil paths 57a and 57b, respectively. Oil pressure supply path B for antiphase steering is constituted by pilot signal pressure introduction chambers 38a and 38b of first control valve 34, coupling paths 49a and 49b, valve left and right chambers 47a and 47b of second control valve 35, oil paths 57a and 57b, first and second annular grooves 51a and 51b of sleeve 45, coupling paths 55a and 55b, first and second ports 53a and 53b, and first and second oil paths 54a and 54b. With this supply path B, the oil pressure generated by power steering device 4 is supplied to hydraulic actuator 24 so that rear wheels 2 are steered in the opposite direction to front wheels 1. The suction port of oil pump 26 is connected to reservoir tank 13 through coupling path 58.

The operation of the four-wheel steering system with the above structure will now be described.

When the vehicle is moving straight while steering wheel 3 is held in the neutral position, piston 8 in power cylinder 6 of power steering device 4 is held in the neutral position. In this case, pilot signal pressure introduction chambers 38a and 38b of first control valve 34, and valve left and right chambers 47a and 47b of second control valve 35 are held in an equal pressure state. Therefore, spools 37 and 46 of first and second control valves 34 and 35 are held in the neutral positions, respectively. For this reason, the working fluid delivered from oil pump 26 is introduced from oil introduction path 43 of hydraulic circuit 32 into first and third annular grooves 42a and 42c of first control valve 34, and thereafter is returned from first and second valve chambers 41a and 41b to reservoir tank 13 through second annular groove 42b and oil return path 44. Therefore, rear wheels 2 are not steered.

When a vehicle is to be turned to the left while moving at high speed, the working fluid delivered from oil pump 14 upon turning of steering wheel 3 is introduced into left chamber 9a of power cylinder 6, and piston 8 is moved to the right from the neutral position. Thus, front wheels 1 are steered to the left, as is indicated by broken line in FIG. 1. In this case, the oil pressure in left chamber 9a of power cylinder 6 becomes higher than that in right chamber 9b. The oil pressure in left pilot signal pressure introduction chamber 38a of first control valve 34 becomes higher than that in right pilot signal pressure introduction chamber 38b. Thus, spool 37 of first control valve 34 is moved to the right in FIG. 2, so that first valve chamber 41a communicates with second annular groove 42b, and second valve chamber 41b communicates with third annular groove 42c. Upon steering operation, the oil pressure in valve left chamber 47a of second control valve 35 also becomes higher than that in valve right chamber 47b. However, when the steering operation is performed while the vehicle is moving at high speed, the oil pressure generated by power steering device 4 is about 20 kg/cm$^2$, and is lower than the operating pressure sure (e.g., 40 kg/cm$^2$) of spool 46 set by the biasing force of springs 48a and 48b for holding spool 46 in the neutral position. Therefore, spool 46 of second control valve 35 is not moved but held in the neutral position. Thus, the working fluid delivered from oil pump 26 is introduced into right chamber 29b of hydraulic cylinder 27 sequentially through oil introduction path 43 of hydraulic circuit 32, third annular groove 42c and second valve chamber 41b of first control valve 34, coupling path 52b, second valve chamber 50b of second control valve 35, second port 53b, and second oil path 54b. As the result, the internal pressure of right chamber 29b of hydraulic cylinder 27 riser, and left chamber 29a of hydraulic cylinder 27 communicates with reservoir tank 13 through first oil path 54a, first port 53a, first valve chamber 50a of second control valve 35, coupling path 52a, first valve chamber 41a of first control valve 34, second annular groove 42b, and oil return path 44. Thus, left chamber 29a is set in a low-pressure state. As a result, since piston 28 of hydraulic cylinder 27 is moved to the left, the leading end portions of front arms 21b of trailing arms 19 are pushed to the left through piston rod 30 and operating rods 31 by the operation of piston 28, and rear wheels 2 are steered to the left as is indicated by broken line in FIG. 1. Thus, rear wheels 2 are steered in the same direction as front wheels 1, thereby improving travel stability upon turning of the vehicle in the high-speed travel state. When the vehicle is to be turned to the right while moving at high speed, spool 37 of first control valve 34 is moved to the left and piston 28 of hydraulic cylinder 27 is moved to the right in a manner opposite to the left turning operation. As a result, rear wheels 2 are steered to the right.

When the vehicle is to be turned to the left while moving at low speed, the working fluid delivered from oil pump 14 upon turning of steering wheel 3 is introduced into left chamber 9a of power cylinder 6, thereby steering front wheels 1 to the left, as is indicated by broken line in FIG. 1. In this case, the oil pressure in left chamber 9a of power cylinder 6 becomes higher than that in right chamber 9b, and the oil pressure in left introduction chamber 38a of first control valve 34 becomes higher than that in right introduction chamber 38b. Thus, spool 37 is moved to the right. At the same time, the oil pressure in valve left chamber 47a of second control valve 35 becomes higher than that in valve right chamber 47b. Upon a steering operation while the vehicle is moving at low speed, the oil pressure generated power steering device 4 is about 60 kg/cm$^2$ or higher, and is higher than the operating pressure of spool 46 set by the biasing force of springs 48a and 48b. For this reason, as is shown in FIG. 4, spool 46 of second control valve 35 is moved to the right. The oil pressure generated by power steering device 4 is introduced into left chamber 29a of hydraulic cylinder 27 sequentially through valve left chamber 47a of second control valve 35, oil path 57a, first annular groove 51a, coupling path 55a, first port 53a, and first oil path 54a. As a result, left chamber 29a of hydraulic cylinder 27 is set in a high-pressure state. Right chamber 29b of hydraulic cylinder 27 communicates with second valve chamber 41b of first control valve 34 through second oil path 54b, second port 53b, second valve chamber 50b, and coupling path 52b. In this case, although second valve chamber 41b communicates with third annular groove 42c, since the oil pressure delivered from oil pump 26 is low, there is no fear of introduction of a high oil pressure from third annular groove 42c to second valve chamber 41b. The oil returned from right chamber 29b of hydraulic cylinder 27 to second valve chamber 41b of first control valve 34 is guided to second annular groove 42b through the wall surfaces of the small-diameter portion between second and third annular grooves 42b and 42c, and a gap between spool 37 and land 37b, and is returned to reservoir tank 13 through oil return path 44. As a result, piston 28 of hydraulic cylinder 27 is moved to the right, and the leading end portions of rear arms 21b of trailing arms 19 are pushed to the right by piston rod 30 and operating rods 31 while being interlocked with the operation of piston 28. Thus, rear wheels 2 are steered to the right, i.e., in the opposite direction to front wheels 1, thereby reducing the turning radius of the vehicle moving at low speed. Note that when the vehicle at low speed is to be turned to the right, spools 37 and 46 of first and second control valves 34 and 35 are moved to the left in a manner opposite to the left-turning operation, thereby steering rear wheels 2 to the left.

According to the system having the above mentioned structure, when oil pump 26 generates a high oil pressure and an oil pressure generated by power steering device 4 is lower than the operating pressure set by springs 48a and 48b, e.g., when the steering operation is performed while the vehicle is moving at high speed, first control valve 34 switches the supply path of the working fluid supplied from oil pump 26 to hydraulic actuator 24, in response to the oil pressure generated by power steering device 4, thereby steering rear wheels 2 in the same direction as front wheels 1. Therefore, travel stability of the vehicle during the steering operation in the high-speed travel state can be improved. When the oil pressure generated by oil pump 26 is low and the oil pressure generated by power steering device 4 is higher than the operating pressure set by springs 48a and 48b, e.g., when steering wheel 3 is turned at a large angle while the vehicle is moving at low speed, oil pressure supply path B for antiphase steering is opened by second control valve 35 against the biasing force of springs 48a and 48b, and the oil pressure generated by power steering device 4 is supplied to hydraulic actuator 24 so as to steer rear wheels 2 in the opposite direction to front wheels 1. Therefore, when the vehicle is moving at low speed, rear wheels 2 can be steered in the opposite direction to front wheels 1, and the turning radius of the vehicle can be reduced, thereby facilitating the parking operation such as a garaging operation and the like. As an oil pressure source for the antiphase steering, the oil pressure generated by power steering device 4 can be utilized. Thus, the structure can be simpler than that in a case wherein a special-purpose oil pressure source for antiphase steering is provided, and the oil pressure is supplied from this oil pressure source to a hydraulic actuator while the vehicle is moving at low speed, thereby steering the rear wheels in the opposite direction to the front wheels.

In addition, it is possible to provide a four-wheel steering system can relize in-and antiphase steering by only hydraulic control, resulting in better control reliability and lower cost than those of a system using electronic control.

FIGS. 4 to 8 show a second embodiment of the present invention. In this embodiment, the structure of control valve unit 33 in the first embodiment is modified. The same reference numerals in the second embodiment denote the same parts as in the first embodiment, and detailed description thereof will be omitted.

In the second embodiment, a pair of third control valves 61 are disposed in valve housing 33a of control valve unit 33 in addition to first control valve 34 for in-phase steering and second control valve 35 for antiphase steering.

Figure 7:
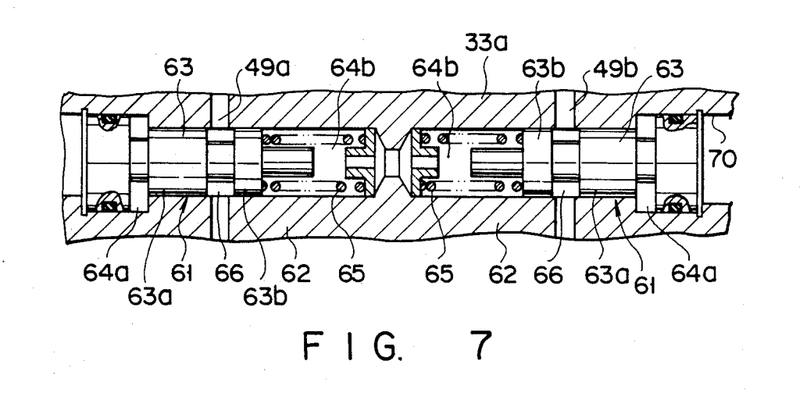
FIG. 7 is a partially enlarged sectional view of FIG. 6.

Third control valves 61 are respectively arranged in coupling path 49a between valve left chamber 47a of second control valve 35 and pilot signal pressure introduction chamber 38a of first control valve 34, and coupling path 49b between valve right chamber 47b of second control valve 35 and pilot signal pressure introduction chamber 38b of first control valve 34. As is shown in FIG. 7, left and right third control valve 61 are symmetrically disposed in valve housing 33a. Each third control valve 61 is constituted by sleeve 62 formed in valve housing 33a and spool 63 housed in sleeve 62 to be axially movable. First and second pressure chambers 64a and 64b are respectively formed in outer and inner end portions in sleeve 62. Compression coil spring 65 for holding spool 63 in a neutral position shown in FIG. 7 is located in second pressure chamber 64b. Lands 63a and 63b are respectively formed on the outer periphery of spool 63, and valve chamber 66 is defined between lands 63a and 63b. When spool 63 is held by spring 65 in the neutral position, valve chamber 66 of left third control valve 61 communicates with coupling path 49a, and valve chamber 66 of right third control valve 61 communicates with coupling path 49b.

Figure 5:
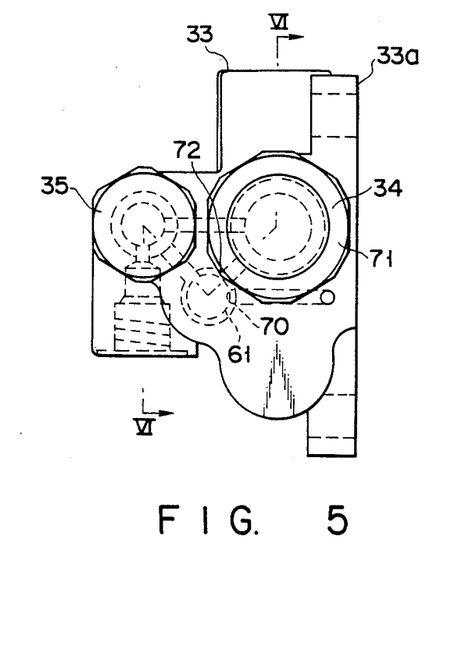
FIG. 5 is a side view of a control valve unit.
Figure 6:
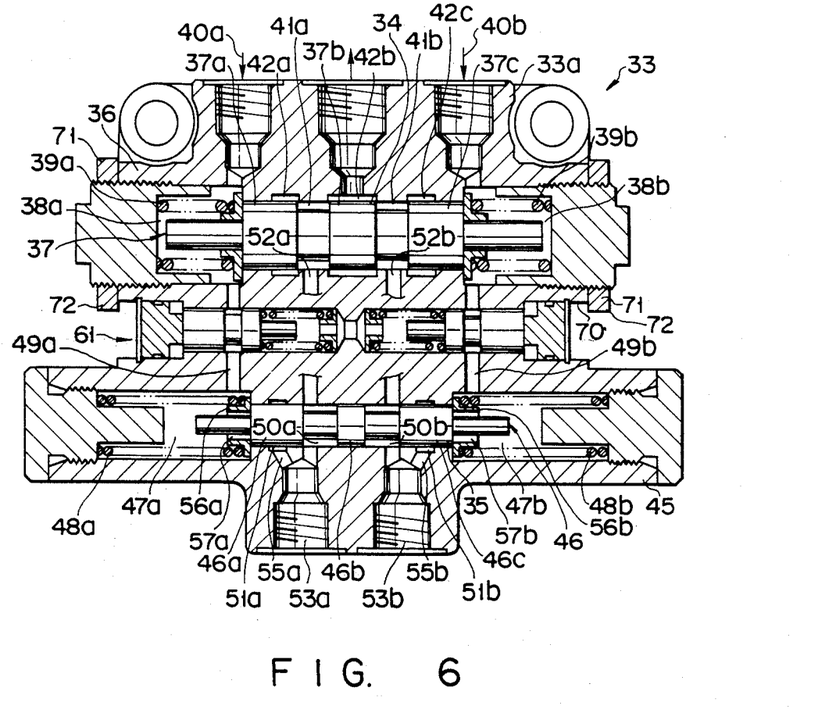
FIG. 6 is a sectional view taken along line VI—VI in FIG. 5.
Figure 8:
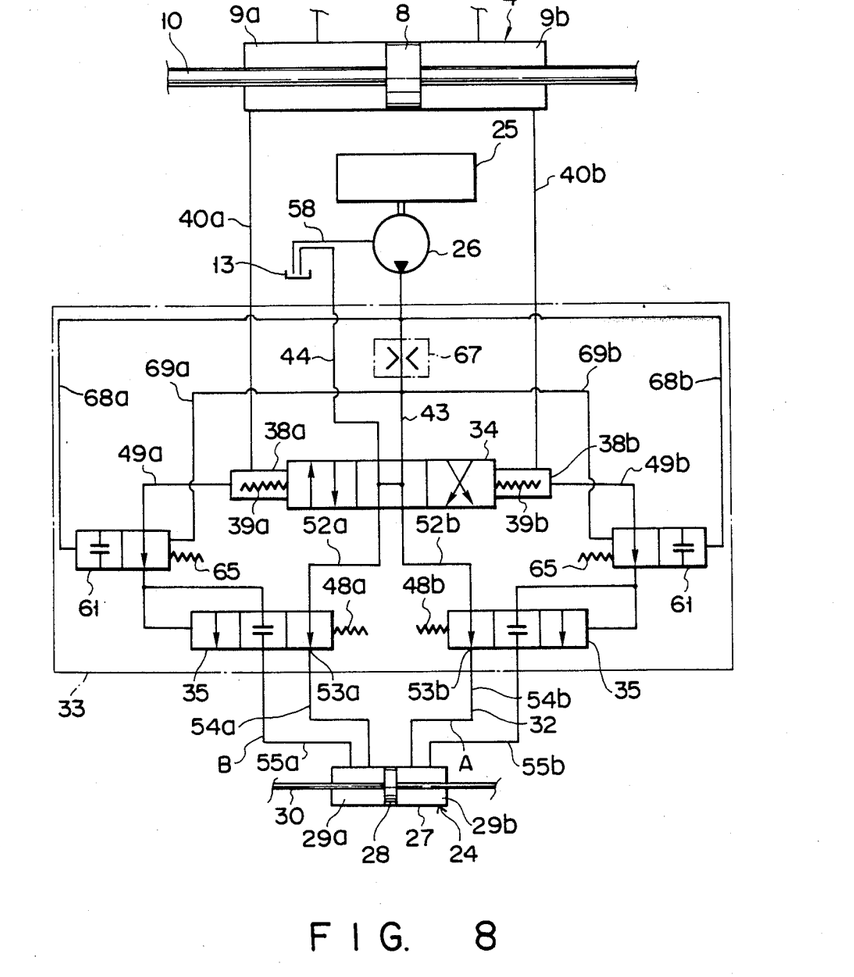
FIG. 8 is a schematic view showing a hydraulic circuit of the system.

As is shown in FIG. 8, orifice 67 is formed midway along oil introduction path 43 for supplying the oil pressure generated by oil pump 26 to first control valve 34. One end of each of a pair of high-pressure oil supply paths 68a and 68b is connected to oil introduction part 43 at the upstream side of orifice 67, and one end of each of a pair of low-pressure oil supply paths 69a and 69b is coupled to part 43 at the downstream side of orifice 67. The other ends of supply paths 68a and 68b are connected to first pressure chambers 64a of left and right third control valves 61, and the other ends of supply paths 69a and 69b are connected to second pressure chambers 64b of left and right third control valves 61. Second pressure chambers 64b of left and right third control valves 61 communicate with each other. Spool 63 of each third control valve 61 is moved in accordance with a pressure difference between the oil pressures in oil introduction path 43 at the upstream and downstream sides of orifice 67. More specifically, when the rotational speed of oil pump 26 is low and the pressure difference between the oil pressures at the upstream and downstream sides of orifice 67 is small, e.g., when the vehicle is moving at low speed, spool 63 of each third control valve 61 is held in the neutral position by the biasing force of spring 65, thereby maintaining the open states of coupling paths 49a and 49b. When the rotational speed of oil pump 26 is high and the pressure difference between the oil pressures at the upstream and downstream sides of orifice 67 is large, e.g., in a high-speed travel state of the vehicle, spools 63 are moved inwardly from the neutral position against the biasing force of springs 65, thereby closing coupling paths 49a and 49b. Therefore, coupling paths 49a and 49b for supplying the oil pressure generated by power steering device 4 to second control valve 35 are opened and closed by third control valves 61 in accordance with the oil pressure generated by oil pump 26, i.e., in accordance with the vehicle velocity. When the oil pressure generated by oil pump 26 exceeds a preset pressure (i.e., when the vehicle velocity exceeds a predetermined value), third control valves 61 close coupling paths 49a and 49b. Note that, as is shown in FIGS. 5 and 6, each set nut 71 of first control valve 34 is partially projected in an opening of mounting hole 70 of corresponding third control valve 61 in an overlapping state, so that each third control valve 61 is prevented from falling out of mounting hole 70 by overlapping portion 72 of set nut 71.

According to the second embodiment constructed as mentioned above, the same operation and effect as in the first embodiment can be obtained since first and second control valves 34 and 35 are arranged.

Furthermore, since third control valves 61 are arranged, coupling paths 49a and 49b are opened and closed in accordance with the pressure difference between the oil pressures in oil introduction path 43 at the upstream and downstream sides of orifice 67. More specifically, when the pressure difference is small, i.e., in a low-speed travel state of the vehicle, spool 63 of each third control valve 61 is held in the neutral position by the biasing force of spring 65. Thus, coupling paths 49a and 49b are kept in the open state. As a result, while the vehicle is moving at low speed, rear wheels 2 can be steered in the opposite direction to front wheels 1. When the pressure difference between he oil pressures at the upstream and downstream sides of orifice 67 is large, i.e., in a high-speed travel state of the vehicle, spools 63 move inwardly from the neutral position against the biasing force of springs 65, thereby closing coupling paths 49a and 49b. Therefore, in the high-speed travel state of the vehicle, rear wheels 2 can be reliably prevented from being steered in the opposite direction to front wheels 1.

When the rear wheels are steered in the opposite direction to the front wheels while the vehicle is moving at high speed, the rear wheels are easy to slip, thus impairing travel stability and safety. However, according to the second embodiment, when the vehicle is moving at high speed, the antiphase steering can be certainly prevented. Accordingly, in addition to the effects of the first embodiment, the second embodiment can further improve travel stability and safety of the vehicle.

What is claimed is:

1. A four-wheel steering system for a vehicle having steerable front and rear wheels, comprising:
    a power steering device for steering the front wheels, said device having a power cylinder connected to the front wheels and adapted to be moved by a steering operation of a steering wheel, and first oil pump means for supplying oil pressure to the power cylinder to assist the movement of the power cylinder in response to the steering operation;
    an oil pressure source comprising second oil pump means for generating oil pressure in accordance with the traveling speed of the vehicle, said second oil pump means being connected to a vehicle power transmitting means and being driven thereby;
    hydraulic actuating means, connected to the rear wheels, for steering the rear wheels in accordance with a transmitted oil pressure;
    first control valve means, arranged between the oil pressure source and the actuating means and connected to the power steering device, and operated by the oil pressure generated by the power steering device, for transmitting the oil pressure from the oil pressure source to the actuating means so that the rear wheels are steered in the same direction as the front wheels; and
    second control valve means, arranged between the power steering device and the actuating means, and operated by the oil pressure generated by the power steering device, for transmitting the oil pressure generated by the power steering device to the actuating means so that the rear wheels are steered in the opposite direction to the front wheels, when the oil pressure from the power steering device exceeds a predetermined value.

2. A system according to claim 1, wherein said power cylinder has left and right pressure chambers communicating with the first oil pump means, and pressures in the pressure chambers are changed in accordance with a steering operation, and said first control valve means includes left and right pilot signal pressure introduction chambers communicating with the left and right pressure chambers, respectively, and a valve member movable in accordance with a pressure difference between the oil pressures in the left and right pilot signal pressure introduction chambers, for switching a path of the oil pressure supplied from the oil pressure source to the actuating means.

3. A system according to claim 1, wherein said power cylinder has left and right pressure chambers communicating with the first oil pump means, and pressures in the pressure chambers are changed in accordance with a steering operation, and said second control valve means includes left and right pilot signal pressure introduction chambers communicating with the left and right pressure chambers, respectively, a valve member movable between a neutral position for disconnecting the left and right pilot signal pressure chambers of the second control valve means from the actuating means, and an actuating position for connecting one of the left and right pilot signal pressure chambers of the second control valve means to the actuating means, in accordance with a pressure difference between the oil pressure in the left and right pilot signal pressure chambers of the second control valve means, and biasing means for biasing the valve member to the neutral position at said predetermined value, wherein when the pressure difference between the oil pressure in the left and right pilot signal pressure chambers exceeds said predetermined value, the valve member is moved from the neutral position to the actuating position.

4. A system according to claim 1, wherein said hydraulic actuating means has left and right pressure chambers;
    which further comprises first hydraulic circuit means for transmitting the oil pressure from the oil pressure source to the left and right pressure chambers through the first and second control valve means, and second hydraulic circuit means for transmitting the oil pressure from the power steering device to the left and right pressure chambers through the second control valve means;

and wherein said first control valve means includes first valve means for switching the first hydraulic circuit means so that the oil pressure from the oil pressure source is transmitted to one of the left and right pressure chambers of the hydraulic actuating means when the oil pressure generated by the power steering device is lower than said predetermined value, and said second control valve means includes second valve means for switching the first circuit means so that the transmission of the oil pressure from the oil pressure source to said one of the left and right pressure chamber is interrupted and for switching the second circuit means so that the oil pressure generated by the power steering device is transmitted to the other of the left and right pressure chambers when the oil pressure generated by the power steering device exceeds said predetermined value.

5. A system according to claim 1, which further comprises a valve housing, and wherein said first control valve means includes a first sleeve formed in the valve housing, a first spool slidably inserted in the first sleeve and having two ends, and left and right pilot signal pressure introduction chambers which are defined at the two ends of the first spool in the first sleeve and communicate with the power steering device, to receive the oil pressure therefrom, and said second control valve means includes a second sleeve formed in the valve housing, a second spool slidably inserted in the second sleeve and having two ends, valve left and right chambers which are defined at the two ends of the second spool and communicate with the left and right pilot signal pressure introduction chambers, respectively.

6. A system according to claim 1, which further comprises third control valve means, arranged between the second control valve means and the power steering device, and operated by the oil pressure generated by the power steering device, for interrupting the transmission of the oil pressure from the power steering device to the second control valve means when the oil pressure generated by the power steering device exceeds a predetermined value.

7. A four-wheel steering system for a vehicle having steerable front and rear wheels, comprising:

a power steering device for steering the front wheels, said device having a power cylinder connected to the front wheels and adapted to be moved by a steering operation of a steering wheel, and first oil pump means for supplying oil pressure to the power cylinder to assist the movement of the power cylinder in response to the steering operation;

an oil pressure source having second oil pump means for generating oil pressure in accordance with the traveling speed of the vehicle, said second oil pump means being connected to a vehicle power transmitting means and being driven thereby;

hydraulic actuating means connected to the rear wheels, for steering the rear wheels in accordance with a transmitted oil pressure;

first hydraulic circuit means for transmitting the oil pressure generated by the oil pressure source to the actuating means;

second hydraulic circuit means for transmitting the oil pressure generated by the power steering device to the actuating means;

first control valve means, arranged in the first circuit means and connected to the power steering device, and operated by the oil pressure generated by the power steering device, for switching the first circuit means in accordance with the oil pressure from the power steering device so that the actuating means steers the rear wheels in the same direction as the front wheels; and second control valve means, arranged in the second circuit means and operated by the oil pressure generated by the power steering device, wherein when the oil pressure generated by the power steering device exceeds a predetermined value, the second circuit means is switched so that the actuating means steers the rear wheels in the opposite direction to the front wheels.

8. A system according to claim 7, wherein said second control valve is provided in the second hydraulic circuit between the first control valve and the hydraulic actuator.

9. A system according to claim 8, which further comprises third control valve means, arranged in the second hydraulic circuit means between the first and second control valve means, and operated by the oil pressure generated by the power steering device, wherein when the oil pressure from the power steering device exceeds a predetermined value, the second hydraulic circuit means is closed.

10. A system according to claim 9, which further comprises orifice means provided in the first hydraulic circuit means between the oil pressure source and the first control valve means, and wherein said third control valve means includes a first pressure introduction chamber communicating with the first hydraulic circuit means between the oil pressure source and the orifice means, a second pressure introduction chamber communicating with said first hydraulic circuit means between the orifice means and the first control valve means, and movable valve means which is operated in accordance with the difference between the oil pressure in the first and second pressure introduction chambers.

* * * * *